United States Patent
Kamaga

(10) Patent No.: US 8,988,042 B2
(45) Date of Patent: Mar. 24, 2015

(54) VEHICLE, CHARGING SYSTEM AND CONTROL METHOD FOR VEHICLE

(75) Inventor: Ryuichi Kamaga, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/504,294

(22) PCT Filed: Aug. 25, 2011

(86) PCT No.: PCT/JP2011/069152
§ 371 (c)(1),
(2), (4) Date: Apr. 26, 2012

(87) PCT Pub. No.: WO2013/027291
PCT Pub. Date: Feb. 28, 2013

(65) Prior Publication Data
US 2014/0167691 A1 Jun. 19, 2014

(51) Int. Cl.
*H02J 7/00* (2006.01)
*B60L 11/18* (2006.01)
(Continued)

(52) U.S. Cl.
CPC ......... *B60L 11/1811* (2013.01); *B60L 11/1838* (2013.01); *B60L 11/1816* (2013.01);
(Continued)

(58) Field of Classification Search
CPC ............ B06L 11/1811; B06L 11/1838; B06L 11/1816; B06L 11/1818; Y02T 10/7088; Y02T 10/7005; Y02T 90/16; Y02T 90/14; Y02T 90/121; Y02T 90/128
USPC .................................................. 320/109, 137
See application file for complete search history.

(56) References Cited

U.S. PATENT DOCUMENTS

2009/0058097 A1 3/2009 Oyobe et al.
2010/0145568 A1 6/2010 Watanabe
(Continued)

FOREIGN PATENT DOCUMENTS

CN 101193769 A 6/2008
JP A-2007-236173 9/2007
(Continued)

OTHER PUBLICATIONS

International Search Report issued in International Application No. PCT/JP2011/069152 dated Dec. 6, 2011 (with translation).

Primary Examiner — Vuthe Siek
(74) Attorney, Agent, or Firm — Oliff PLC

(57) ABSTRACT

In a vehicle (100), a power storage device (110) mounted thereon can be charged with electric power transmitted from an external power supply device (500, 500A) via a power cable (400, 400A). The vehicle (100) includes a PLC communication unit (230) for establishing PLC communication with the external power supply device (500, 500A) via the power cable (400). An ECU (300) starts transmission of a signal from the PLC communication unit (230) to the external power supply device (500, 500A) in response to connection of the power cable (400) to an inlet (220). When a response from the external power supply device (500, 500A) to the signal is not received, the ECU (300) switches a CCID (430, 540) provided in the power cable (400) or the external power supply device (500A) to a state in which supply of the electric power is possible, and thereafter, retransmits the signal from the PLC communication unit (230) to the external power supply device (500, 500A).

13 Claims, 8 Drawing Sheets

(51) Int. Cl.
*B60L 3/00* (2006.01)
*B60L 3/04* (2006.01)
*B60L 7/14* (2006.01)
*B60L 11/12* (2006.01)
*B60L 11/14* (2006.01)

(52) U.S. Cl.
CPC ........... *B60L11/1818* (2013.01); *B60L 3/0069* (2013.01); *B60L 3/04* (2013.01); *B60L 7/14* (2013.01); *B60L 11/123* (2013.01); *B60L 11/14* (2013.01); *B60L 11/1846* (2013.01); *Y02T 10/7088* (2013.01); *Y02T 10/7005* (2013.01); *Y02T 90/16* (2013.01); *Y02T 90/163* (2013.01); *Y02T 90/121* (2013.01); *Y02T 90/14* (2013.01); *Y02T 90/128* (2013.01); *B60L 2210/10* (2013.01); *B60L 2210/40* (2013.01); *B60L 2220/14* (2013.01); *B60L 2240/547* (2013.01); *B60L 2240/549* (2013.01); *B60L 2250/10* (2013.01); *B60L 2250/16* (2013.01); *B60L 2270/20* (2013.01)
USPC .......................................... 320/109; 320/137

(56) References Cited

U.S. PATENT DOCUMENTS

| | | | |
|---|---|---|---|
| 2011/0285350 A1* | 11/2011 | Mitsutani | 320/109 |
| 2012/0098488 A1* | 4/2012 | Ichikawa | 320/109 |
| 2012/0299715 A1* | 11/2012 | Ichikawa | 340/455 |
| 2013/0207607 A1* | 8/2013 | Sugiyama et al. | 320/109 |

FOREIGN PATENT DOCUMENTS

| | | |
|---|---|---|
| JP | A-2009-033265 | 2/2009 |
| JP | A-2010-17007 | 1/2010 |
| JP | A-2010-142001 | 6/2010 |
| WO | WO 2011/077505 A1 | 6/2011 |

* cited by examiner

VEHICLE, CHARGING SYSTEM AND CONTROL METHOD FOR VEHICLE

TECHNICAL FIELD

The present invention relates to a vehicle, a charging system and a control method for the vehicle, and more particularly to charging control for the vehicle in which a power storage device mounted thereon can be charged with electric power provided from an external power supply.

BACKGROUND ART

In recent years, a vehicle that has a power storage device (e.g., a secondary battery, a capacitor and the like) mounted thereon and runs using driving force generated from electric power stored in the power storage device has received attention as an environmentally-friendly vehicle. This vehicle includes, for example, an electric vehicle, a hybrid vehicle, a fuel cell vehicle and the like. There has been proposed a technique of charging the power storage device mounted on this vehicle by a commercial power supply having high power generation efficiency.

Similarly to the electric vehicle, as for the hybrid vehicle, there has been known a vehicle in which charging (hereinafter, also simply referred to as "external charging") of a vehicle-mounted power storage device by a power supply external to the vehicle (hereinafter, also simply referred to as "external power supply") is possible. For example, there has been known a so-called "plug-in hybrid vehicle" in which the power storage device can be charged from a power supply in an ordinary household by connecting an outlet provided at a house and a charging port provided at the vehicle through a charging cable. It can be expected that this leads to enhancement of the fuel consumption efficiency of the hybrid vehicle.

Japanese Patent Laying-Open No. 2009-033265 (PTL 1) discloses such a configuration that, in a vehicle capable of external charging, information is transmitted between the vehicle and an external power supply as well as between the vehicle and another vehicle via a charging port by Power Line Communication (PLC).

CITATION LIST

Patent Literature

PTL 1: Japanese Patent Laying-Open No. 2009-033265
PTL 2: WO 2011/077505

SUMMARY OF INVENTION

Technical Problem

In external charging, a signal is received and transmitted between the vehicle and the charging cable or between the vehicle and the external power supply, and information such as a capacity of charging power that can be transmitted from the external power supply and a rated current of the charging cable is transmitted to the vehicle. Based on the transmitted information, the vehicle starts/stops charging and controls the charging power.

Such transmission of the information may be implemented using a pilot signal provided from the charging cable or the external power supply.

In recent years, there has been developed a technique like smart grid of not only charging a vehicle-mounted power storage device using a household power supply (external power supply) but also supplying electric power stored in the vehicle to a household when necessary. In such a case, supply/interruption of electric power and control over supplied electric power from the household side to the vehicle side are necessary, and use of the PLC communication that does not require addition of a special wiring has been under consideration.

In some types of the external power supply and the charging cable, however, the PLC communication cannot be appropriately established when a power interruption relay included in the external power supply and the charging cable interrupts a power transmission path. Further, the fixed and the same external power supply and charging cable are not always connected to the vehicle. Therefore, in the vehicle, it must be determined whether communication with the external power supply and the charging cable is established using the pilot signal or using the PLC communication.

The present invention has been made to solve the above-mentioned problems, and an object of the present invention is to, in a vehicle capable of external charging, achieve reliable transmission of information between the vehicle and a connected external power supply or power cable.

Solution to Problem

In a vehicle according to the present invention, a power storage device mounted thereon can be charged with electric power transmitted from an external power supply device via a power cable. The vehicle includes: an inlet to which the power cable is connected; a PLC communication unit configured to be capable of establishing power line communication with the external power supply device via a power line in the power cable; and a control device for controlling a charging operation of the power storage device. The power cable or the external power supply device includes a switching device for switching between supply and interruption of the electric power from the external power supply device to the vehicle. The control device starts transmission of a signal from the PLC communication unit to the external power supply device in response to connection of the power cable to the inlet, and when a transmission signal from the external power supply device to the PLC communication unit is not received, the control device switches the switching device to a state in which the supply of the electric power from the external power supply device to the vehicle is possible, and thereafter, retransmits the signal from the PLC communication unit to the external power supply device.

Preferably, when the power cable is connected to the inlet, the control device changes a potential of a pilot signal from the switching device to a first potential, and thereafter, starts transmission by the PLC communication unit.

Preferably, the transmission signal is a response from the external power supply device to transmission of the signal from the PLC communication unit to the external power supply device. When the transmission signal is received, the control device changes the potential of the pilot signal to a second potential lower than the first potential to switch the switching device to the state in which the supply of the electric power from the external power supply device to the vehicle is possible, and performs the charging operation based on communication information from the external power supply device.

Preferably, the transmission signal is a response from the external power supply device to transmission of the signal from the PLC communication unit to the external power supply device. When the transmission signal is not received, the control device suspends transmission by the PLC communication unit, changes the potential of the pilot signal to a second potential lower than the first potential to switch the switching device to the state in which the supply of the electric power from the external power supply device to the vehicle is possible, and thereafter, executes retransmission by the PLC communication unit.

Preferably, when the response from the external power supply device to the signal retransmitted from the PLC communication unit is received, the control device performs the charging operation based on communication information from the external power supply device.

Preferably, when the response from the external power supply device to the signal retransmitted from the PLC communication unit is not received, the control device stops transmission by the PLC communication unit.

Preferably, when the response from the external power supply device to the signal retransmitted from the PLC communication unit is not received, the control device performs the charging operation based on an oscillation state of the pilot signal.

Preferably, when the response from the external power supply device to the signal retransmitted from the PLC communication unit is not received, the control device notifies a user that PLC communication cannot be established between the vehicle and the external power supply device.

Preferably, the vehicle is configured to be capable of supplying electric power from the power storage device to an external device connected to the external power supply device, via the inlet and the power cable.

Preferably, the PLC communication unit is configured to be capable of establishing power line communication with the external power supply device via the power line in the power cable. The control device performs a power feeding operation based on communication information from the external power supply device.

Preferably, the switching device includes: a relay for switching between electrical connection and disconnection between a power source in the external power supply device and the vehicle; and a signal generation unit for generating a pilot signal transmitted to the control device via a communication line included in the power cable and different from the power line. The signal generation unit causes the pilot signal to oscillate in response to a fact that a potential of the pilot signal attains a first potential. The relay is closed in response to a fact that the potential of the pilot signal attains a second potential lower than the first potential.

A charging system according to the present invention includes: a power cable; an external power supply device; and a vehicle in which a power storage device mounted thereon can be charged with electric power transmitted from the external power supply device via the power cable. The vehicle includes: an inlet to which the power cable is connected; a PLC communication unit configured to be capable of establishing power line communication with the external power supply device via a power line in the power cable; and a control device for controlling a charging operation of the power storage device. The power cable or the external power supply device includes a switching device for switching between supply and interruption of the electric power from the external power supply device to the vehicle. The control device starts transmission of a signal from the PLC communication unit to the external power supply device in response to connection of the power cable to the inlet, and when a transmission signal from the external power supply device to the PLC communication unit is not received, the control device switches the switching device to a state in which the supply of the electric power from the external power supply device to the vehicle is possible, and thereafter, retransmits the signal from the PLC communication unit to the external power supply device.

A control method for a vehicle according to the present invention is directed to a control method for a vehicle in which a power storage device mounted thereon can be charged with electric power transmitted from an external power supply device via a power cable. The vehicle includes: an inlet to which the power cable is connected; and a PLC communication unit configured to be capable of establishing power line communication with the external power supply device via a power line in the power cable. The power cable or the external power supply device includes a switching device for switching between supply and interruption of the electric power from the external power supply device to the vehicle. The control method includes the steps of: determining whether or not the power cable is connected to the inlet; starting transmission of a signal from the PLC communication unit to the external power supply device in response to connection of the power cable to the inlet; and when a transmission signal from the external power supply device to the PLC communication unit is not received, switching the switching device to a state in which the supply of the electric power from the external power supply device to the vehicle is possible, and thereafter, retransmitting the signal from the PLC communication unit to the external power supply device.

Advantageous Effects of Invention

According to the present invention, in the vehicle capable of external charging, reliable transmission of information can be achieved between the vehicle and the connected external power supply or power cable.

DESCRIPTION OF EMBODIMENTS

Figure 1:
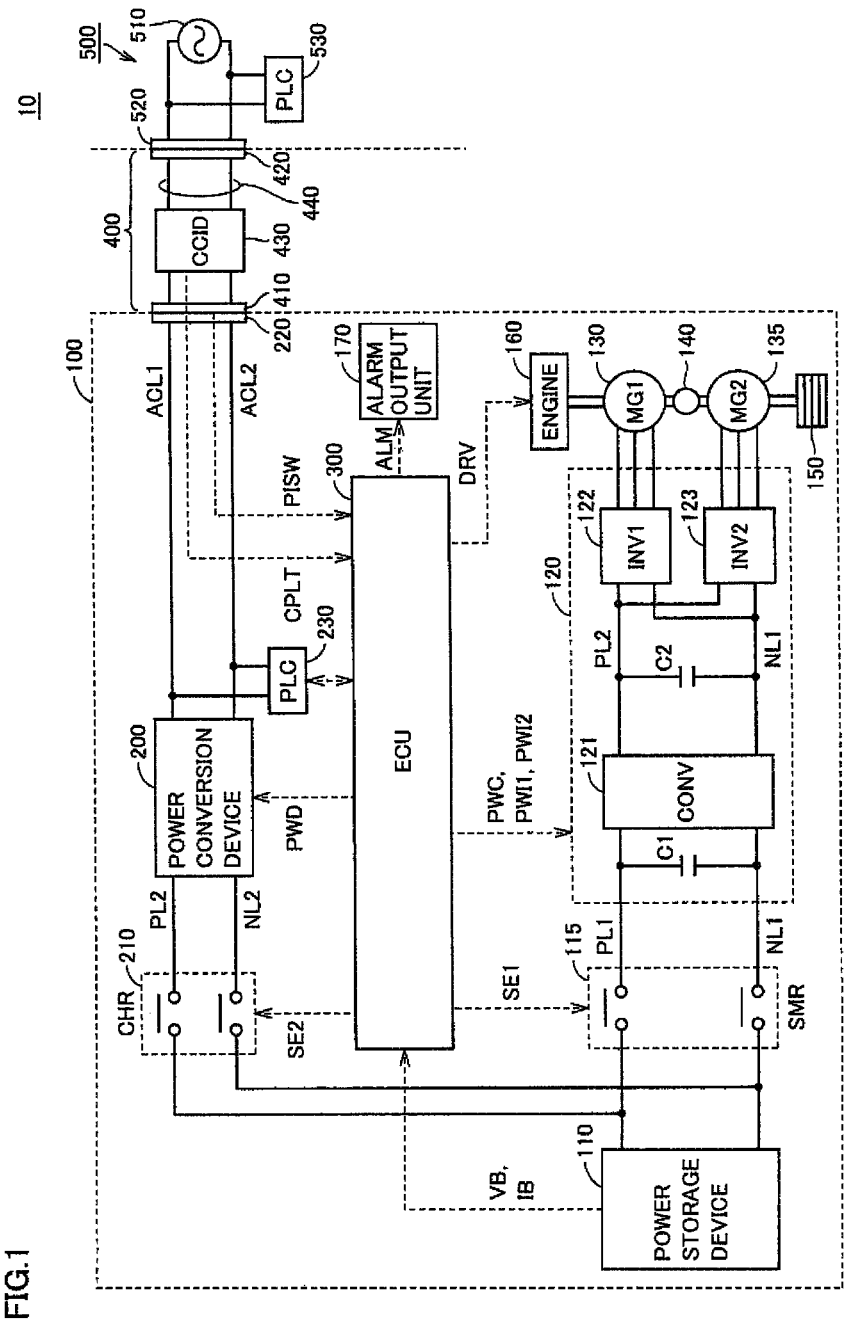
FIG. 1 is an overall block diagram of a charging system including a vehicle according to the present embodiment.

Embodiments of the present invention will be described in detail hereinafter with reference to the drawings, in which the same or corresponding portions are denoted by the same reference characters and description thereof will not be repeated.

[Description of Charging System]

FIG. 1 is an overall block diagram of a charging system 10 including a vehicle 100 according to the present embodiment. Referring to FIG. 1, vehicle 100 includes a power storage device 110, a system main relay (SMR) 115, a PCU (Power Control Unit) 120 serving as a drive device, motor generators 130 and 135, a motive power transmission gear 140, a driving wheel 150, an engine 160 serving as an internal combustion engine, and an ECU (Electronic Control Unit) 300 serving as a control device. PCU 120 includes a converter 121, inverters 122 and 123, and capacitors C1 and C2.

Although a hybrid vehicle having motor generators 130 and 135 and engine 160 is described by way of example in the present embodiment, engine 160 is not an essential component. The present invention is also applicable to an electric vehicle or a fuel cell vehicle that does not have engine 160.

Power storage device 110 is an electric power storage element configured to be rechargeable. Power storage device 110 is configured to include a power storage element such as, for example, a secondary battery including a lithium ion battery, a nickel-metal hydride battery, a lead storage battery or the like, or an electric double layer capacitor.

Power storage device 110 is connected to PCU 120 by power lines PL1 and NL1. Power storage device 110 supplies electric power for generating driving force of vehicle 100 to PCU 120. Power storage device 110 also stores electric power generated by motor generators 130 and 135. The output of power storage device 110 is approximately 200 V, for example.

Power storage device 110 includes a voltage sensor and a current sensor that are not shown, and outputs a voltage VB and a current TB of power storage device 110 detected by these sensors to ECU 300.

One relay included in SMR 115 is connected to a positive electrode end of power storage device 110 and power line PL1 connected to PCU 120, and the other relay is connected to a negative electrode end of power storage device 110 and power line NL1. Based on a control signal SE1 provided from ECU 300, SMR 115 switches between supply and interruption of electric power between power storage device 110 and PCU 120.

Based on a control signal PWC provided from ECU 300, converter 121 makes voltage conversion between power lines PL1, NL1 and power lines PL2, NL1.

Inverters 122 and 123 are connected to power lines PL2 and NL1 in parallel. Based on control signals PWI1 and PWI2 provided from ECU 300, inverters 122 and 123 convert DC electric power supplied from converter 121 into AC electric power and drive motor generators 130 and 135, respectively.

Capacitor C1 is provided between power lines PL1 and NL1, and reduces voltage fluctuations between power lines PL1 and NL1. Capacitor C2 is provided between power lines PL2 and NL1, and reduces voltage fluctuations between power lines PL2 and NL1.

Motor generators 130 and 135 are each an AC rotating electric machine, and for example a permanent magnet-type synchronous motor including a rotor having a permanent magnet embedded therein.

Output torque of motor generators 130 and 135 is transmitted to driving wheel 150 via motive power transmission gear 140 configured to include a reducer and a power split device, and causes vehicle 100 to run. During the regenerative braking operation of vehicle 100, motor generators 130 and 135 can generate electric power using rotational force of driving wheel 150. The generated electric power is then converted by PCU 120 into charging power of power storage device 110.

Further, motor generators 130 and 135 are coupled to engine 160 via motive power transmission gear 140. Motor generators 130 and 135 as well as engine 160 are cooperatively operated by ECU 300 so as to generate necessary vehicle driving force. Furthermore, motor generators 130 and 135 can generate electric power by rotation of engine 160, and power storage device 110 can be charged using this generated electric power. It is to be noted that in the present embodiment, motor generator 135 is used entirely as a motor for driving wheel 150, and motor generator 130 is used entirely as a generator driven by engine 160.

Although FIG. 1 shows by way of example the configuration in which two motor generators are provided, the number of motor generators is not limited thereto. One motor generator or more than two motor generators may be provided.

As a configuration for charging power storage device 110 with electric power provided from an AC power source 510 in external power supply device 500, vehicle 100 includes a power conversion device 200, a charging relay CHR 210, an inlet 220 serving as a connecting unit, and a PLC communication unit 230 for the PLC communication.

A connector 410 of a power cable 400 is connected to inlet 220. The electric power provided from external power supply device 500 is transmitted to vehicle 100 via power cable 400.

In addition to connector 410, power cable 400 includes a plug 420 for connecting to an outlet 520 in external power supply device 500, and a power line 440 connecting connector 410 and plug 420. A charging circuit interrupt device (hereinafter, also referred to as CCID) 430 for switching between supply and interruption of the electric power from external power supply device 500 is inserted in power line 440.

Power conversion device 200 is connected to inlet 220 by power lines ACL1 and ACL2. Power conversion device 200 is also connected to power storage device 110 by power lines PL2 and NL2, with CHR 210 interposed therebetween.

Power conversion device 200 is controlled in accordance with a control signal PWD provided from ECU 300, and converts AC electric power supplied from external power supply device 500 via inlet 220 into the charging power of power storage device 110. As described below, power conversion device 200 can also convert DC electric power provided from power storage device 110 or DC electric power generated by motor generators 130 and 135 and converted by PCU 120 into AC electric power, and supply the AC electric power to the outside of the vehicle. Power conversion device 200 may be one device capable of making bidirectional power conversion of charging and power feeding, or may include a device for charging and a device for power feeding as separate devices.

CHR 210 is controlled in accordance with a control signal SE2 provided from ECU 300, and switches between supply and interruption of electric power between power conversion device 200 and power storage device 110.

PLC communication unit 230 is connected to power lines ACL1 and ACL2. PLC communication unit 230 communicates with a PLC communication unit 530 included in external power supply device 500 via power cable 400 and power lines ACL1 and ACL2. PLC communication unit 230 transmits vehicle information received from ECU 300 to PLC communication unit 530 in external power supply device 500. PLC communication unit 230 also receives power supply information transmitted from PLC communication unit 530 and outputs the received power supply information to ECU 300.

ECU 300 includes a CPU (Central Processing Unit), a memory device and an input/output buffer that are not shown in FIG. 1. ECU 300 inputs a signal provided from each sensor and the like and outputs a control signal to each device, and controls power storage device 110 and each device in vehicle 100. It is to be noted that the control over these devices can be implemented by not only processing by software but also processing by dedicated hardware (electronic circuit).

Based on detected values of voltage VB and current IB provided from power storage device 110, ECU 300 calculates a state of charge (SOC) of power storage device 110.

ECU 300 receives a signal PISW indicating the connection state of power cable 400 from connector 410. ECU 300 also receives a pilot signal CPLT from CCID 430 in power cable 400. As described below with reference to FIG. 2, ECU 300 performs a charging operation based on these signals and/or information received by PLC communication unit 230.

Although FIG. 1 shows the configuration in which one control device is provided as ECU 300, separate control devices such as a control device for PCU 120 and a control device for power storage device 110 may be provided for each function or for each device to be controlled.

An alarm output unit 170 receives a control signal ALM from ECU 300, and notifies a user of information included in control signal ALM when an abnormality, a failure or the like occurs in vehicle 100. Alarm output unit 170 includes a unit for acoustically notifying the user such as a buzzer or a chime, and a unit for visually notifying the user such as an LED, a lamp or a liquid crystal display.

Figure 2:
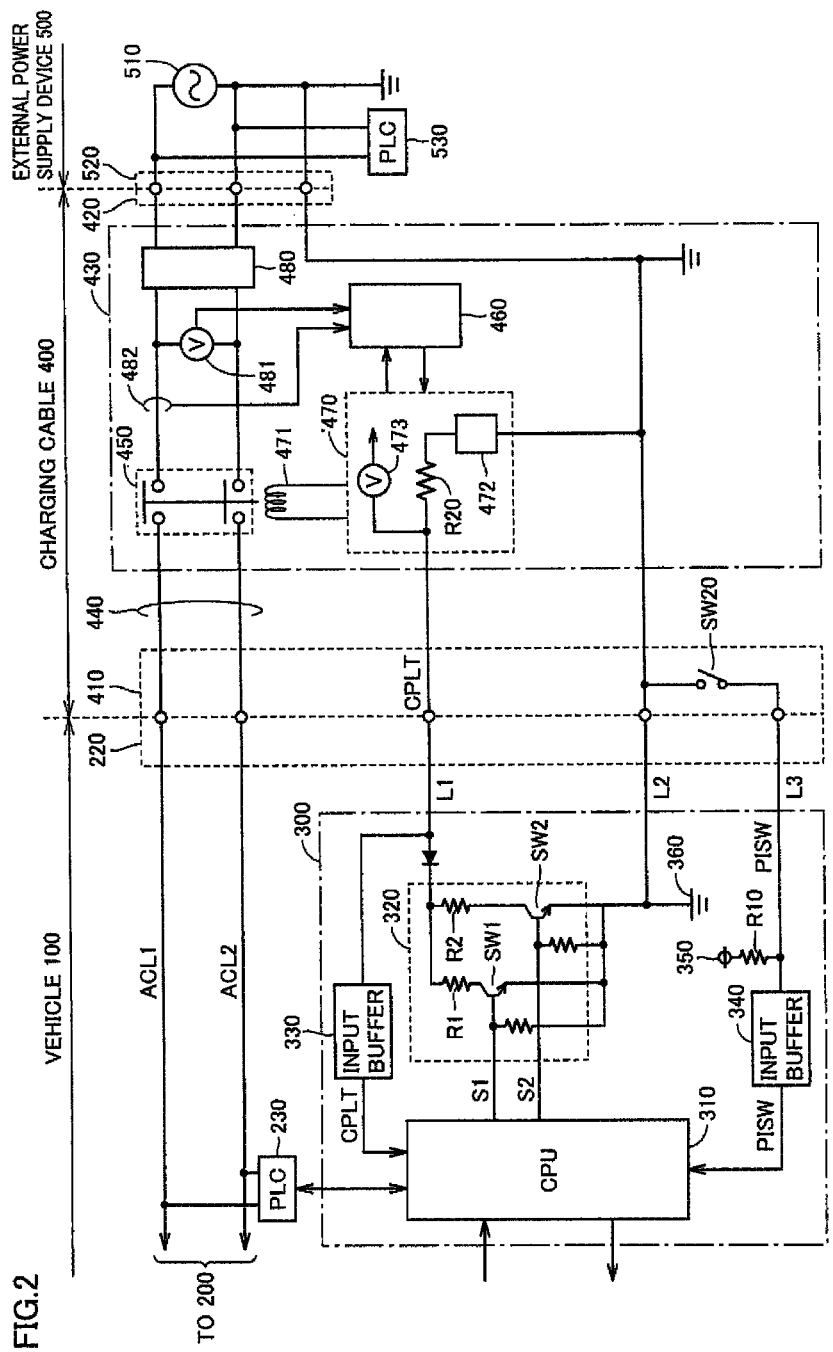
FIG. 2 is a block diagram for describing a charging operation in the charging system in FIG. 1.

FIG. 2 is a block diagram for describing the charging operation in FIG. 1. Description of elements overlapping with the elements in FIG. 1 to which the same reference characters are allotted will not be repeated in FIG. 2.

Referring to FIG. 2, CCID 430 includes a CCID relay 450, a CCID control unit 460, a control pilot circuit 470, an electromagnetic coil 471, a leakage detector 480, a voltage sensor 481, and a current sensor 482. Control pilot circuit 470 includes an oscillation device 472, a resistance R20 and a voltage sensor 473.

CCID relay 450 is inserted in power line 440 in power cable 400. CCID relay 450 is controlled by control pilot circuit 470. When CCID relay 450 is open, an electric path in power cable 400 is interrupted. On the other hand, when CCID relay 450 is closed, electric power is supplied from external power supply device 500 to vehicle 100.

Control pilot circuit 470 outputs pilot signal CPLT to ECU 300 via connector 410 and inlet 220. This pilot signal CPLT is a signal for providing a notification of a rated current of power cable 400 from control pilot circuit 470 to ECU 300. Pilot signal CPLT is also used as a signal for remotely controlling CCID relay 450 by ECU 300 based on the potential of pilot signal CPLT controlled by ECU 300. Control pilot circuit 470 controls CCID relay 450 based on a change in potential of pilot signal CPLT.

A configuration standardized by, for example, SAE (Society of Automotive Engineers) in the United States of America, Japan Electric Vehicle Association and the like may be used as above-mentioned pilot signal CPLT and connection signal PISW, the shape of inlet 220 and connector 410, the terminal arrangement and the like.

CCID control unit 460 includes a CPU, a memory device and an input/output buffer that are not shown. CCID control unit 460 inputs and outputs signals from/to each sensor and control pilot circuit 470, and controls the charging operation of power cable 400.

When the potential of pilot signal CPLT detected by voltage sensor 473 is a defined potential (e.g., 12 V), oscillation device 472 outputs a non-oscillating signal. When the potential of pilot signal CPLT becomes lower than the above-mentioned defined potential (e.g., 9 V), oscillation device 472 outputs a signal controlled by CCID control unit 460 and oscillating at a defined frequency (e.g., 1 kHz) and duty cycle.

The potential of pilot signal CPLT is controlled by ECU 300. The duty cycle is set based on the rated current that can be supplied from external power supply device 500 to vehicle 100 via power cable 400.

When the potential of pilot signal CPLT becomes lower than the defined potential as described above, pilot signal CPLT oscillates at a defined cycle. A pulse width of pilot signal CPLT is set based on the rated current that can be supplied from external power supply device 500 to vehicle 100 via power cable 400. In other words, in accordance with a duty indicated by a ratio of the pulse width to this oscillation cycle, a notification of the rated current is provided from control pilot circuit 470 to ECU 300 in vehicle 100 using pilot signal CPLT.

It is to be noted that the rated current is defined for each power cable. The rated current varies depending on the type of power cable 400. Therefore, the duty of pilot signal CPLT also varies depending on the type of power cable 400.

Based on the duty of pilot signal CPLT received via a control pilot line L1, ECU 300 can sense the rated current that can be supplied to vehicle 100 via power cable 400.

When the potential of pilot signal CPLT is further lowered (e.g., 6 V) by ECU 300, control pilot circuit 470 supplies a current to electromagnetic coil 471. Upon being supplied with the current from control pilot circuit 470, electromagnetic coil 471 generates electromagnetic force and closes a contact point of CCID relay 450 to bring CCID relay 450 into conduction.

Leakage detector 480 is provided within CCID 430 and inserted in power line 440 of power cable 400, and detects presence or absence of leakage. Specifically, leakage detector 480 detects equilibrium of currents flowing through a pair of power lines 440 in the direction opposite to each other, and senses occurrence of leakage when the equilibrium breaks. Although not specifically shown, when leakage detector 480 detects leakage, power feeding to electromagnetic coil 471 is interrupted and the contact point of CCID relay 450 is opened to bring CCID relay 450 out of conduction.

When plug 420 in power cable 400 is inserted into outlet 520, voltage sensor 481 detects a power supply voltage transmitted from external power supply device 500, and provides a notification of the detected value to CCID control unit 460. Further, current sensor 482 detects a charging current flowing through power line 440, and provides a notification of the detected value to CCID control unit 460.

A switch SW20 serving as a connection sensing circuit is included in connector 410. Switch SW20 is, for example, a limit switch and a contact point thereof is closed when connector 410 is certainly fitted into inlet 220. When connector 410 is disconnected from inlet 220, and when connector 410 is not fitted into inlet 220 appropriately, the contact point of switch SW20 is opened. The contact point of switch SW20 is also opened when an operation unit (not shown) provided at connector 410 and operated by the user at the time of removing connector 410 from inlet 220 is operated.

In the state in which connector 410 is disconnected from inlet 220, a voltage signal defined by a voltage of a power supply node 350 included in ECU 300 and a pull-up resistance R10 are generated as connection signal PISW at a connection signal line L3. In the state in which connector 410 is certainly connected to inlet 220, connection signal line L3 is connected to a vehicle earth 360 by a ground line L2 and connection signal line L3 attains a ground potential. It is to be noted that switch SW20 may be replaced with a resistance having a predetermined resistance value. In this case, in the state in which connector 410 is certainly connected to inlet 220, a potential defined by a voltage of power supply node 350, pull-up resistance R10, and the resistance are generated at connection signal line L3.

By detecting a potential of connection signal line L3 (i.e., a potential of connection signal PISW), ECU 300 can determine the connection state of connector 410.

In vehicle 100, ECU 300 further includes a CPU 310, a resistance circuit 320, and input buffers 330 and 340, in addition to above-mentioned power supply node 350 and pull-up resistance R10.

Resistance circuit 320 includes pull-down resistances R1 and R2, and switches SW1 and SW2. Pull-down resistance R1 and switch SW1 are serially connected between vehicle earth 360 and control pilot line L1 via which pilot signal CPLT is communicated. Pull-down resistance R2 and switch SW2 are also serially connected between vehicle earth 360 and control pilot line L1. In accordance with control signals S1 and S2 provided from CPU 310, switches SW1 and SW2 are controlled to be brought into or out of conduction, respectively.

This resistance circuit 320 is a circuit for controlling the potential of pilot signal CPLT from the vehicle 100 side.

Input buffer 330 receives pilot signal CPLT of control pilot line L1, and outputs received pilot signal CPLT to CPU 310. Input buffer 340 receives connection signal PISW from connection signal line L3 connected to switch SW20 in connector 410, and outputs received connection signal PISW to CPU 310. A voltage is applied to connection signal line L3 by ECU 300 as described above, and when connector 410 is connected to inlet 220, the potential of connection signal PISW changes. CPU 310 detects this potential of connection signal PISW, thereby detecting the connection state of connector 410.

CPU 310 receives pilot signal CPLT and connection signal PISW from input buffers 330 and 340, respectively. CPU 310 detects the potential of connection signal PISW, and detects the connection state and the fitting state of connector 410. CPU 310 also senses the oscillation state and the duty cycle of pilot signal CPLT, thereby detecting the rated current of power cable 400.

Based on the potential of connection signal PISW and the oscillation state of pilot signal CPLT, CPU 310 controls control signals S1 and S2 of switches SW1 and SW2, thereby controlling the potential of pilot signal CPLT. As a result, CPU 310 can remotely control CCID relay 450. Thus, electric power is transmitted from external power supply device 500 to vehicle 100 via power cable 400.

In addition, CPU 310 is configured to be capable of receiving and transmitting a signal from/to PLC communication unit 230 connected to power lines ACL1 and ACL2. CPU 310 transmits vehicle information to external power supply device 500 via PLC communication unit 230, and receives power supply information transmitted from external power supply device 500 via PLC communication unit 230.

Referring to FIGS. 1 and 2, when the contact point of CCID relay 450 is closed, AC electric power from external power supply device 500 is provided to power conversion device 200, and preparation for charging power storage device 110 by external power supply device 500 is completed. CPU 310 outputs control signal PWD to power conversion device 200, and thereby the AC electric power provided from external power supply device 500 is converted into the DC electric power with which power storage device 110 can be charged. Then, CPU 310 outputs control signal SE2 to close a contact point of CHR 210, and thereby charging of power storage device 110 is carried out.

Figure 3:
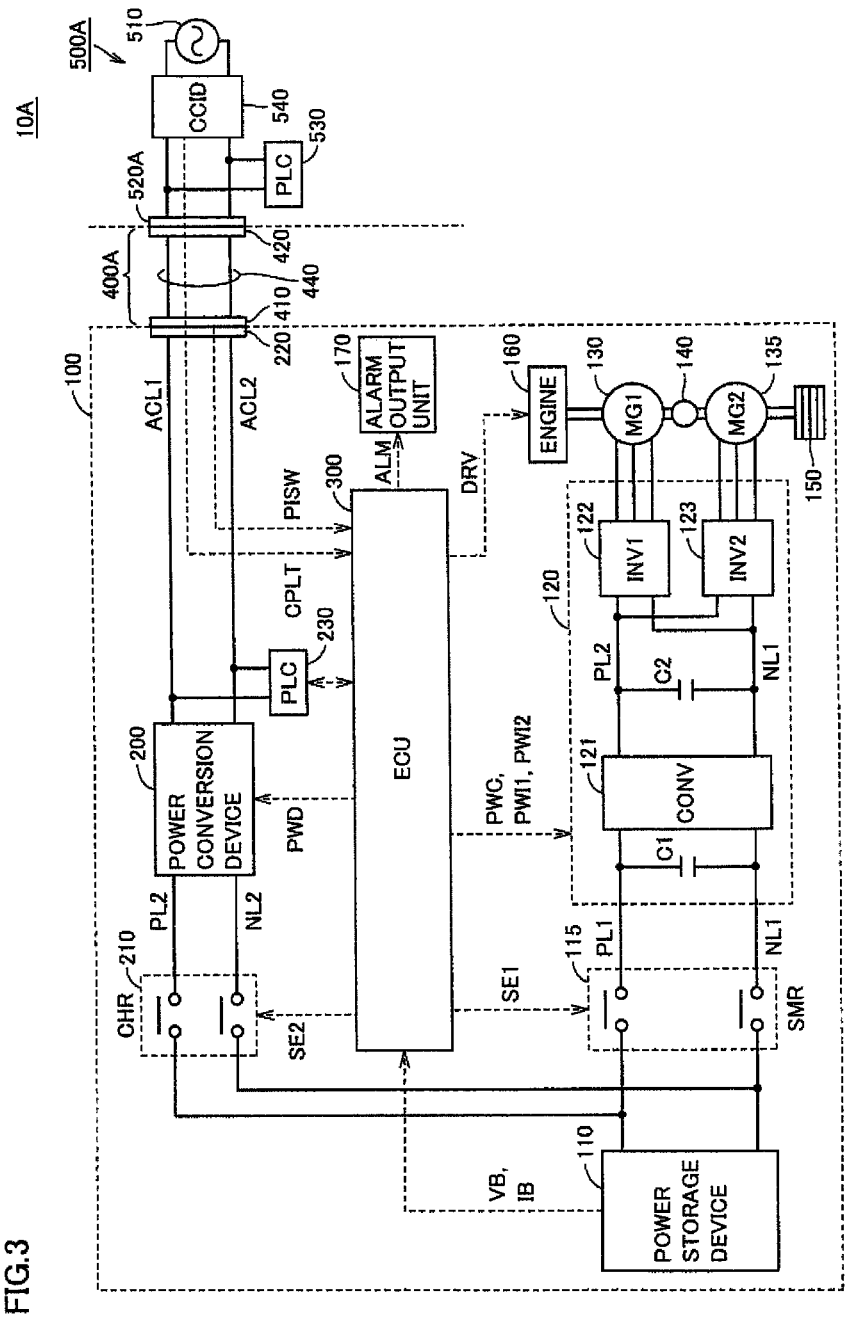
FIG. 3 is an overall block diagram of a charging system when an external power supply is provided with a CCID function.
Figure 4:
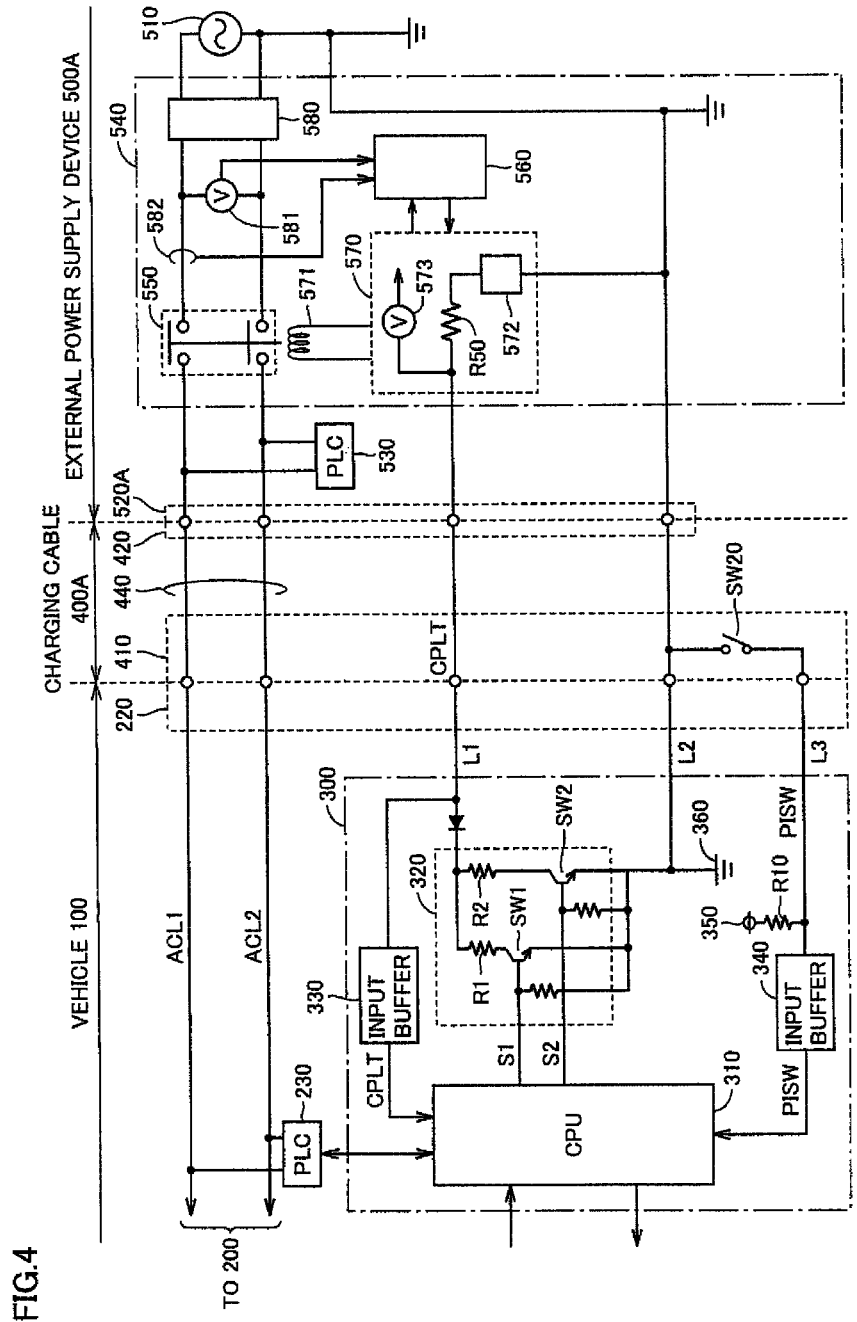
FIG. 4 is a block diagram for describing a charging operation in the charging system in FIG. 3.

FIG. 3 is an overall block diagram of another charging system 10A including vehicle 100 according to the present embodiment. In charging system 10A, a power cable 400A does not include CCID 430 as in power cable 400 in FIG. 1. Instead, an external power supply device 500A includes a CCID 540. FIG. 4 is a block diagram for describing a charging operation in FIG. 3.

Description of elements overlapping with the elements in FIGS. 1 and 2 will not be repeated in FIGS. 3 and 4. In addition, the configuration of CCID 540 in FIG. 4 is basically the same as the configuration of CCID 430 in FIG. 2, and thus, detailed description thereof will not be repeated.

Referring to FIGS. 3 and 4, CCID 540 is inserted in a power line connecting AC power source 510 and an outlet 520A in external power supply device 500A. In addition, control pilot line L1 and ground line L2 in vehicle 100 are connected to CCID 540 via power cable 400A.

PLC communication unit 530 is connected to a power line connecting CCID 540 and outlet 520A. In charging system 10A, CCID 540 is included in external power supply device 500A. Therefore, the current capacity of connected power cable 400A is set in accordance with input by the user, or when power cable 400A is fixedly connected to external power supply device 500A, the duty of pilot signal CPLT is set to a fixed value.

[Problems of Charging System]

In charging systems 10 and 10A, the charging operation can be started/stopped and the signals related to the rated current of the power cable can be received/transmitted based on the potential and the duty of pilot signal CPLT. In these systems like smart grid, however, various information is further required such as the state of charge of the vehicle, the estimated time of next running, the state of other devices connected to the external power supply device, or a power feeding request command to the vehicle. Therefore, in charging systems 10 and 10A, these information is transmitted by the PLC communication using PLC communication units 230 and 530, in addition to the information transmitted using pilot signal CPLT.

In the case of a system like charging system 1 0A shown in FIGS. 3 and 4, even when a CCID relay 550 included in CCID 540 is open, communication can be established because PLC communication unit 230 and PLC communication unit 530 are connected by power cable 400A.

In charging system 10 shown in FIGS. 1 and 2, however, when CCID relay 450 in power cable 400 is opened, PLC communication unit 230 is disconnected from PLC communication unit 530, and thus, the PLC communication cannot be established. In this case, prior to establishing the PLC communication, CCID relay 450 must be closed.

Furthermore, in the case of a system in which the external power supply device does not have the PLC communication unit, or when the PLC communication unit in the external power supply device cannot establish communication due to a failure and the like, the PLC communication cannot be established even if vehicle 100 has PLC communication unit 230. In such a case, the charging operation must be performed based on the state of pilot signal. CPLT.

As described above, in the charging system, a method for communication with the power cable and the external power supply device varies depending on the configuration of the power cable and the external power supply device connected to the vehicle, Therefore, if the communication method is not selected in accordance with the system configuration, the appropriate charging operation may be impossible.

Therefore, in the present embodiment, in the vehicle having the PLC communication function and capable of external charging, there is performed charging control by which the charging operation is performed using the appropriate communication method in accordance with the configuration of the power cable and the external power supply device in the charging system.

[Description of Charging Control in the Present Embodiment]

Figure 5:
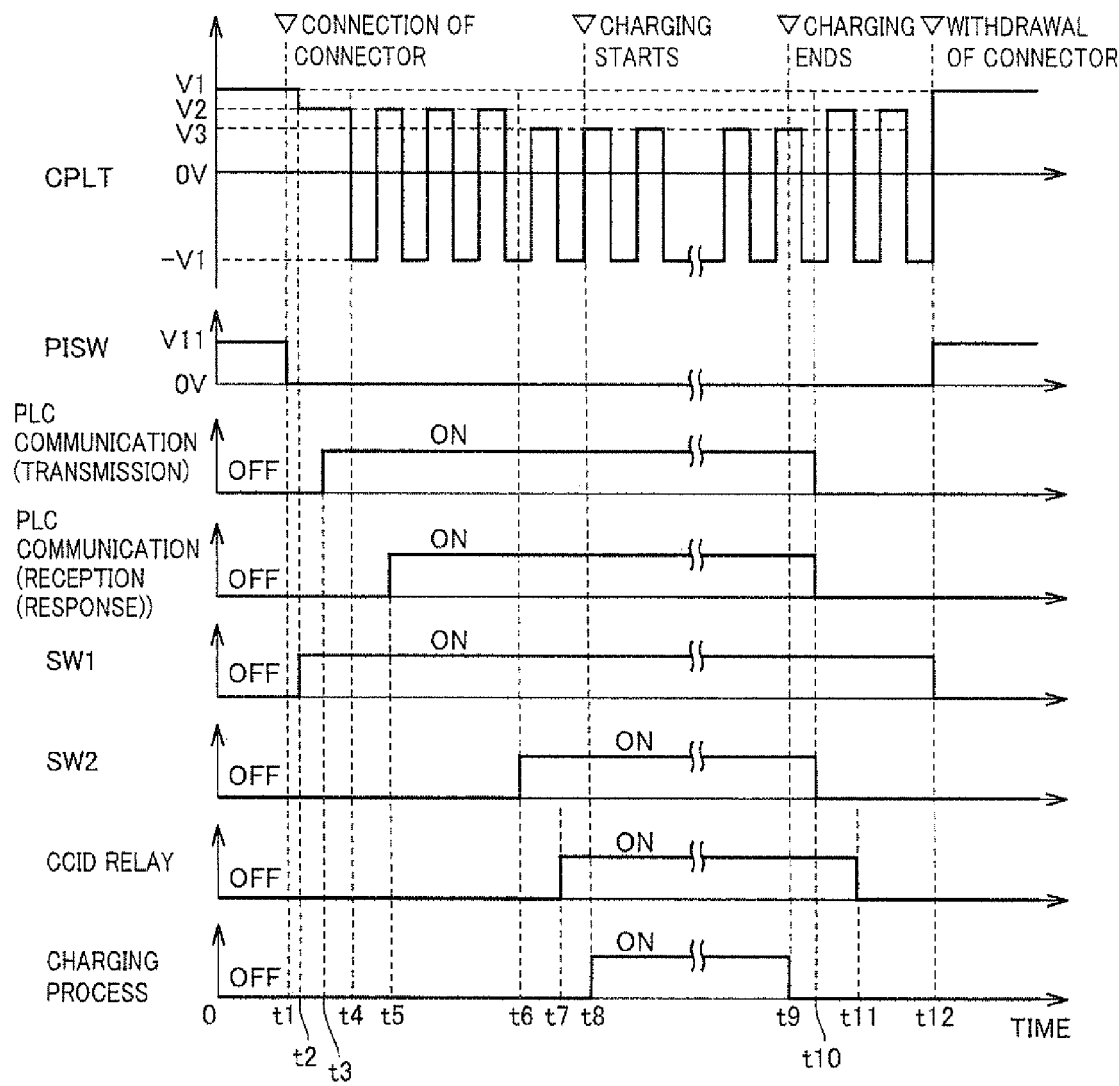
FIG. 5 is a time chart of the charging operation in the charging system in FIG. 3.
Figure 6:
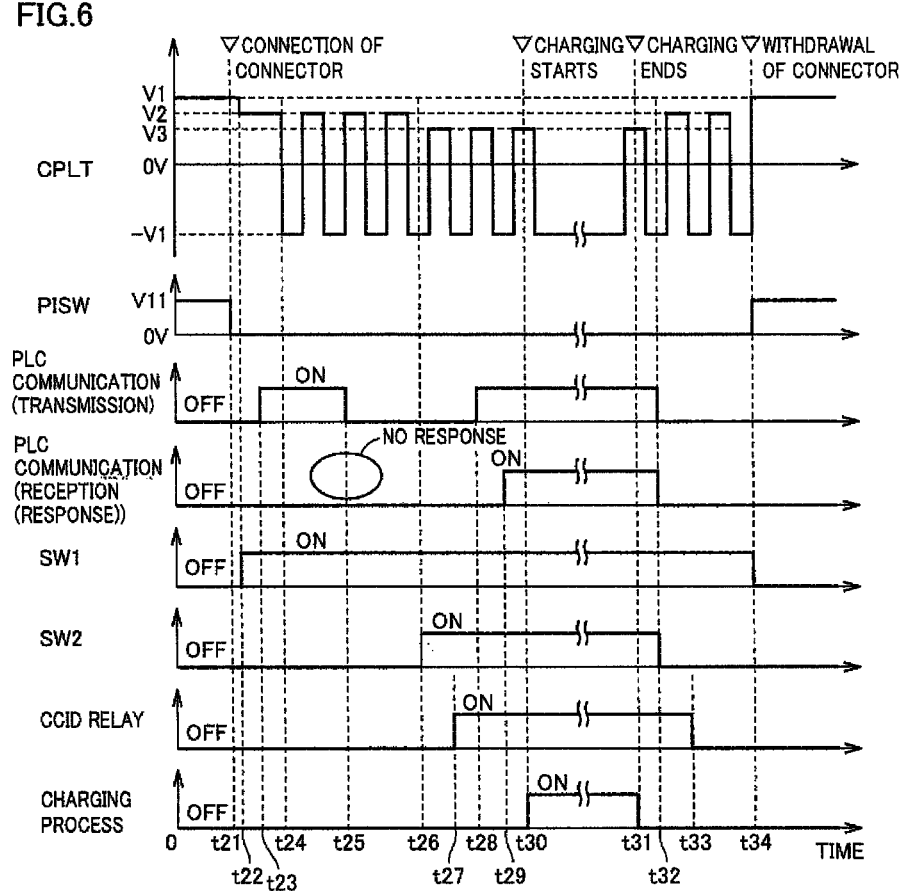
FIG. 6 is a time chart of the charging operation in the charging system in FIG. 1.
Figure 7:
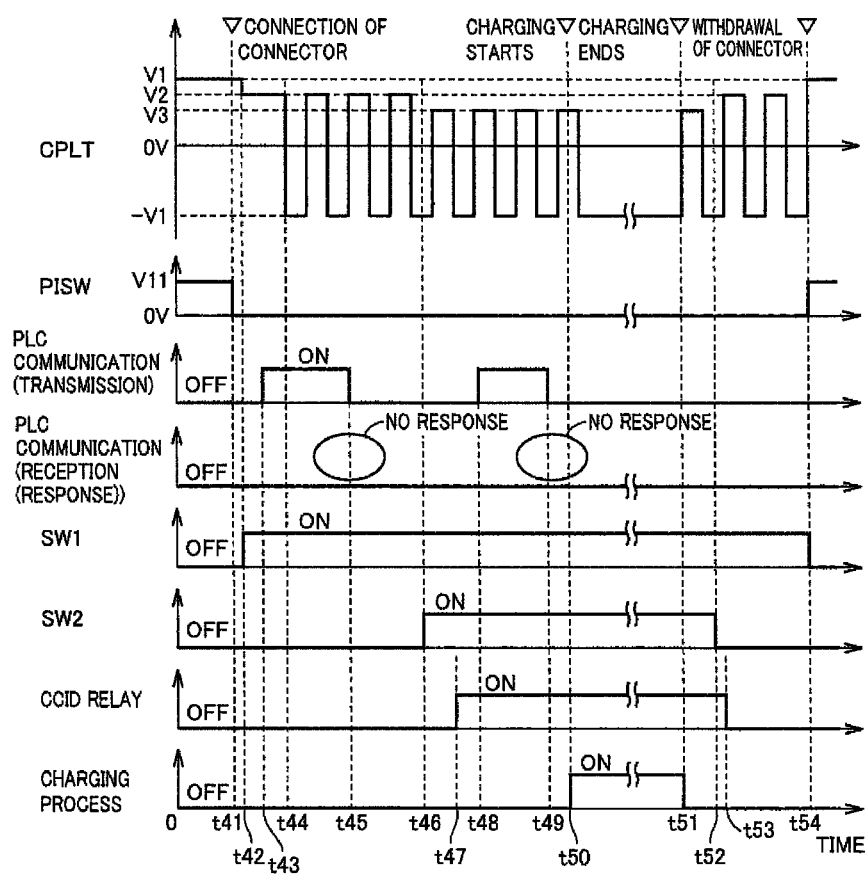
FIG. 7 is a time chart of a charging operation when PLC communication is impossible.

The charging operation in different system configurations will be described with reference to time charts in FIGS. 5 to 7. FIG. 5 is a time chart when the PLC communication is possible regardless of the operating state of the CCID relay, as in charging system 10A shown in FIGS. 3 and 4. FIG. 6 is a time chart when the PLC communication is possible with the CCID relay closed, as in charging system 10 shown in FIGS. 1 and 2. FIG. 7 is a time chart when the external power supply device does not include the PLC communication unit or when the PLC communication is impossible due to a failure and the like occurring in the PLC communication unit.

First, referring to FIGS. 4 and 5, before time t1, connector 410 is not connected to inlet 220. In this state, pilot signal CPLT is at a potential V1 (e.g., 12 V) and in the non-oscillating state, and the potential of connection signal PISW is at a potential V11 defined by power supply node 350.

At time t1, connector 410 is connected to inlet 220. Then, switch SW20 included in connector 410 is closed, and thereby connection signal line L3 is connected to ground line L2 and the potential of connection signal PISW attains the ground potential. As a result, CPU 310 recognizes that connector 410 has been connected to inlet 220. In response to this, CPU 310 renders control signal S1 active and brings switch SW1 into conduction (time t2). As a result, the potential of pilot signal CPLT decreases to V2 (e.g., 9 V), and in response to this, an oscillation device 572 in CCID 540 starts oscillation of pilot signal CPLT (time t4).

In addition, when connector 410 is connected to inlet 220, CPU 310 starts transmission of a signal from PLC communication unit 230 to PLC communication unit 530 in external power supply device 500A (time t3). Since the PLC communication is possible regardless of the operating state of CCID relay 550 in charging system 10A, PLC communication unit 530 in external power supply device 500A transmits a response signal to the signal provided from PLC communication unit 230 on the vehicle 100 side. Upon receiving the response signal from PLC communication unit 530 in external power supply device 500A, CPU 310 recognizes that the PLC communication has been established (time t5).

When the PLC communication between vehicle 100 and external power supply device 500A is established, CPU 310 obtains the power supply information (such as, for example, a supplied voltage, a supplied current, the current capacity of the power cable) for charging by external power supply device 500A, and makes preparation for charging based on the information. In this case, CPU 310 gives a higher priority to the information obtained by the PLC communication than to the duty of pilot signal CPLT.

Then, at time t6, CPU 310 renders control signal S2 active and brings switch SW2 into conduction. Then, the potential of pilot signal CPLT decreases to V3 (e.g., 6 V). In response to this, CCID relay 550 in CCID 540 is closed (time t7), and electric power is supplied from external power supply device 500A to vehicle 100.

At time t8, CPU 310 drives CHR 210 (FIG. 3) and power conversion device 200 (FIG. 3), thereby starting a charging process.

Thereafter, charging of power storage device 110 (FIG. 3) proceeds, and at time t9, the charging process ends. In response to this, the PLC communication is stopped (time t10). Furthermore, control signal S2 is rendered inactive, switch SW2 is brought out of conduction, and the potential of pilot signal CPLT rises to V2. In response to this, at time t11, CCID relay 550 is opened and the electric power supply from external power supply device 500A to vehicle 100 is stopped.

When the user finally pulls connector 410 out of inlet 220 (time t12), the potential of connection signal PISW recovers to V11. In response to this, control signal S1 is rendered inactive and switch SW1 is brought out of conduction. Then, the potential of pilot signal CPLT recovers to V1.

Next, the case of charging system 10 shown in FIGS. 1 and 2 will be described with reference to FIG. 6.

Referring to FIGS. 2 and 6, before time t24, a process similar to the process before time t4 in FIG. 5 is executed. When CPU 310 recognizes that connector 410 has been connected to inlet 220, CPU 310 starts transmission of the signal from PLC communication unit 230 to PLC communication unit 530 in external power supply device 500.

In charging system 10, however, CCID 430 is provided in power cable 400. Therefore, PLC communication unit 530 in external power supply device 500 cannot receive the signal provided from PLC communication unit 230 on the vehicle 100 side, and does not output the response signal thereto.

When CPU 310 recognizes that the response signal from PLC communication unit 530 in external power supply device 500 is not received during a predetermined time period after transmission of the signal from PLC communication unit 230 started (time t25), CPU 310 suspends transmission of the signal from PLC communication unit 230, renders control signal S2 active and brings switch SW2 into conduction (time t26).

As a result, the potential of pilot signal CPLT decreases to V2. In response to this, CCID relay 450 is closed (time t27). As a result, electric power from external power supply device 500 is supplied to vehicle 100, and PLC communication units 230 and 530 are connected.

In this state, CPU 310 retransmits the signal to external power supply device 500 via PLC communication unit 230 (time t28). In this case, CCID relay 450 is closed, and thus, PLC communication unit 530 in external power supply device 500 can receive the signal provided from PLC communication unit 230, and outputs the response signal thereto.

Upon receiving the response signal from PLC communication unit 530 in external power supply device 500 (time t29), CPU 310 starts the PLC communication with external power supply device 500, and executes the charging process based on the power supply information provided from external power supply device 500 (time t30). The subsequent charging end process is similar to that described with reference to time t9 and the subsequent times in FIG. 5.

As described above, FIG. 7 is a time chart when the external power supply device does not have the PLC communication unit or when the PLC communication unit cannot establish communication due to a failure and the like. In this case, CPU 310 does not receive the response signal to the transmission signal provided from PLC communication unit 230 in vehicle 100.

Referring to FIG. 7, before time t48, a process similar to the process before time t28 in FIG. 6 is executed. CPU 310 first transmits the signal from PLC communication unit 230 in vehicle 100 to the external power supply device, with the CCID relay being open. In response to the fact that the response signal is not received, CPU 310 suspends transmission of the signal from PLC communication unit 230 (time t45). Thereafter, CPU 310 closes the CCID relay (time t47), and retransmits the signal from PLC communication unit 230 to the external power supply device (time t48).

In the case shown in FIG. 7, the response signal from the PLC communication unit on the external power supply device side is not received in retransmission of the signal as well. Therefore, at time t49, CPU 310 stops transmission of the signal from PLC communication unit 230 to the external power supply device, and reads the duty of pilot signal CPLT and recognizes the rated current of the power cable.

Thereafter, CPU 310 sets the charging current based on the rated current of the power cable, and starts the charging operation at time t50. The subsequent charging end process is similar to that described with reference to time t9 and the subsequent times in FIG. 5.

As described above, in the present embodiment, the vehicle can appropriately obtain the information required for the charging operation using the PLC communication or the pilot signal, in accordance with the configuration of the power cable and the external power supply device connected to the vehicle during external charging.

Figure 8:
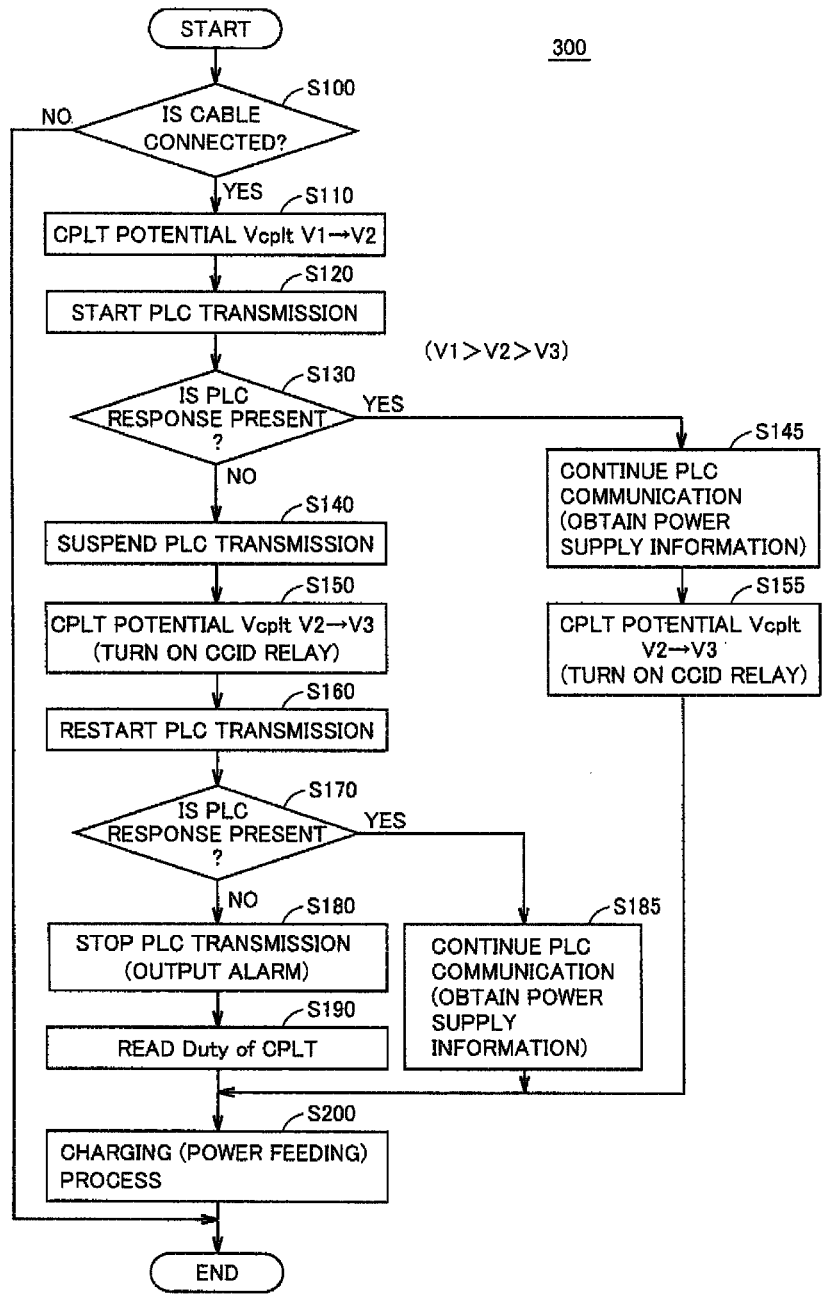
FIG. 8 is a flowchart for describing a charging process executed by an ECU in the present embodiment.

FIG. 8 is a flowchart for describing the charging process executed by ECU 300 in the present embodiment. The flowchart shown in FIG. 8 is implemented by calling a program prestored in ECU 300 from the main routine and executing the program at a predetermined cycle. Alternatively, a part of the steps can also be implemented by dedicated hardware (electronic circuit).

Referring to FIG. 8, in step (hereinafter, the step will be abbreviated as "S") 100, ECU 300 determines whether or not connector 410 in the power cable is connected, based on the potential of connection signal PISW.

If connector 410 is not connected (NO in S100), external charging is not carried out, and thus, ECU 300 ends the process.

If connector 410 is connected (YES in S100), the process proceeds to S110. ECU 300 renders control signal S1 active and brings switch SW1 into conduction. As a result, a potential Vcplt of pilot signal CPLT changes from V1 to V2.

In response to the fact that potential Vcplt of pilot signal CPLT decreases to V2, and more specifically the fact that potential Vcplt of pilot signal CPLT falls within a first range (V3<Vcplt≤V2), the CCID causes pilot signal CPLT to oscillate.

Then, in S120, ECU 300 starts transmission of the signal via PLC communication unit 230 to PLC communication unit 530 in the external power supply device, and determines whether or not the response signal from PLC communication unit 530 to the transmission signal is present (S130).

If the response signal from PLC communication unit 530 is present (YES in S130), the process proceeds to S145. ECU 300 continues the PLC communication with PLC communication unit 530 in the external power supply device and obtains the power supply information provided from the external power supply device.

Thereafter, in S155, ECU 300 renders control signal S2 active and brings switch SW2 into conduction. As a result, potential Vcplt of pilot signal CPLT changes from V2 to V3. Then, in response to the fact that potential Vcplt of pilot signal CPLT decreases to V3, and more specifically the fact that potential Vcplt of pilot signal CPLT falls within a second range (Vcplt≤V3), the CCID closes the CCID relay. As a result, electric power is supplied from the external power supply device to vehicle 100.

Then, in S200, ECU 300 executes the charging process based on the power supply information obtained in S145.

On the other hand, if the response signal from PLC communication unit 530 is not present in S130 (NO in S130), the process proceeds to S140. ECU 300 suspends transmission of the signal to PLC communication unit 530 in the external power supply device.

Then, ECU 300 renders control signal S2 active and brings switch SW2 into conduction As a result, potential Vcplt of pilot signal CPLT changes from V2 to V3, and the CCID relay is closed as described above (S150). As a result, electric power is supplied from the external power supply device to vehicle 100.

Thereafter, in S160, ECU 300 restarts transmission of the signal to PLC communication unit 530 in the external power supply device, and again determines whether or not the response signal from PLC communication unit 530 to the transmission signal is present (S160).

If the response signal from PLC communication unit 530 is present (YES in S160), the process proceeds to S185. ECU 300 continues the PLC communication with PLC communication unit 530 in the external power supply device and obtains the power supply information provided from the external power supply device. Thereafter, the process proceeds to S200 and ECU 300 executes the charging process based on the obtained power supply information.

If the response signal from PLC communication unit 530 is not present (NO in S160), the process proceeds to S180. ECU 300 determines that the external power supply device does not have the PLC communication unit or that the PLC communication unit cannot establish communication due to a failure and the like, and stops transmission of the signal to PLC communication unit 530. At this time, ECU 300 also outputs an alarm to alarm output unit 170 and notifies the user that the PLC communication cannot be established between vehicle 100 and the external power supply device.

In S190, ECU 300 reads the duty Duty of pilot signal CPLT, thereby determining the rated current of the power cable. Then, in S200, ECU 300 executes the charging process based on the rated current.

With the control in accordance with the above-mentioned process, in the charging system including the vehicle having the PLC communication function, the communication method can be selected in accordance with the configuration of the power cable and the external power supply device, and the power supply information for external charging can be appropriately obtained. As a result, in both of the case where the PLC communication is possible without closing the CCID relay and the case where the PLC communication is possible by closing the CCID relay, the power supply information can be appropriately obtained by the PLC communication. In addition, when the PLC communication is impossible, the charging process can be executed based on pilot signal CPLT. Therefore, even in the case of a different configuration of the power cable and the external power supply device, the charging process can be appropriately executed.

Although the case of external charging from the external power supply device to the vehicle has been described above, the present invention is also applicable to the case of supplying electric power stored in the vehicle or electric power generated at the vehicle to a device or power network external to the vehicle. In this case, the step in S200 in the flowchart shown in FIG. 8 is changed into a discharging process, and thereby the ECU may transmit the vehicle information such as the state of charge of the vehicle and specifications of the power conversion device to a control device in the device or power network external to the vehicle by the PLC communication, and may receive an electric power supply command from the device or power network external to the vehicle and supply electric power from the vehicle based on the received command. In addition, when the PLC communication is impossible, the ECU may recognize that now is in an electric power supply mode as well as an output current to be supplied, based on the duty (or potential, frequency and the like)

of the pilot signal, and may supply electric power from the vehicle based on the recognition.

"CCID 430, 540" in the present embodiment is one example of "switching device" in the present invention. In addition, "control pilot circuit 470, 570" in the present embodiment is one example of "signal generation unit" in the present invention.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

REFERENCE SIGNS LIST

10, 10A charging system; 100 vehicle; 110 power storage device; 115 SMR; 120 PCU; 121 converter; 122, 123 inverter; 130, 135 motor generator; 140 motive power transmission gear; 150 driving wheel; 160 engine; 170 alarm output unit; 200 power conversion device; 210 CHR; 220 inlet; 230, 530 PLC communication unit; 300 ECU; 310 CPU; 320 resistance circuit; 330, 340 input buffer; 350 power supply node; 360 vehicle earth; 400, 400A power cable; 410 connector; 420 plug; 430, 540 CCID; 440 power line; 450, 550 CCID relay; 460, 560 CCID control unit; 470, 570 control pilot circuit; 471, 571 electromagnetic coil; 472, 572 oscillation device; 473, 573 voltage sensor; 480, 580 leakage detector; 481, 581 voltage sensor; 482, 582 current sensor; 500, 500A external power supply device; 510 AC power source; 520, 520A outlet; ACL1, ACL2, PL1, PL2, NL1, NL2 power line; C1, C2 capacitor; L1 control pilot line; L2 ground line; L3 connection signal line; R1, R2, R10, R20, R50 resistance; SW1, SW2, SW20 switch

The invention claimed is:

1. A vehicle in which a power storage device mounted thereon is configured to be charged with electric power transmitted from an external power supply device via a power cable, the vehicle comprising:
an inlet to which said power cable is connected;
a PLC communication unit configured to establish power line communication with said external power supply device via a power line in said power cable; and
a control device for controlling a charging operation of said power storage device,
said power cable or said external power supply device including a switching device for switching between supply and interruption of the electric power from said external power supply device to said vehicle,
said switching device includes a relay for switching between electrical connection and disconnection between a power source in said external power supply device and said vehicle, wherein
said control device starts transmission of a request signal from said PLC communication unit to said external power supply device in response to connection of said power cable to said inlet, and when a transmission signal from said external power supply device to said PLC communication unit is not received, said control device closes said relay, and thereafter, retransmits said request signal from said PLC communication unit to said external power supply device.

2. The vehicle according to claim 1, wherein
when said power cable is connected to said inlet, said control device changes a potential of a pilot signal from said switching device to a first potential, and thereafter, starts transmission by said PLC communication unit.

3. The vehicle according to claim 2, wherein
said transmission signal is a response from said external power supply device to transmission of said request signal from said PLC communication unit to said external power supply device, and
when said transmission signal is received, said control device changes the potential of said pilot signal to a second potential lower than said first potential to close said relay, and performs the charging operation based on communication information from said external power supply device.

4. The vehicle according to claim 2, wherein
said transmission signal is a response from said external power supply device to transmission of said request signal from said PLC communication unit to said external power supply device, and
when said transmission signal is not received, said control device suspends transmission by said PLC communication unit, changes the potential of said pilot signal to a second potential lower than said first potential to close said relay, and thereafter, executes retransmission by said PLC communication unit.

5. The vehicle according to claim 4, wherein
when the response from said external power supply device to said request signal retransmitted from said PLC communication unit is received, said control device performs the charging operation based on communication information from said external power supply device.

6. The vehicle according to claim 4, wherein
when the response from said external power supply device to said request signal retransmitted from said PLC communication unit is not received, said control device stops transmission by said PLC communication unit.

7. The vehicle according to claim 6, wherein
when the response from said external power supply device to said request signal retransmitted from said PLC communication unit is not received, said control device performs the charging operation based on an oscillation state of said pilot signal.

8. The vehicle according to claim 6, wherein
when the response from said external power supply device to said request signal retransmitted from said PLC communication unit is not received, said control device notifies a user that PLC communication cannot be established between said vehicle and said external power supply device.

9. The vehicle according to claim 1, wherein
said vehicle is configured to supply electric power from said power storage device to an external device connected to said external power supply device, via said inlet and said power cable.

10. The vehicle according to claim 9, wherein
said PLC communication unit is configured to establish power line communication with said external power supply device via said power line in said power cable, and
said control device performs a power feeding operation based on communication information from said external power supply device.

11. The vehicle according to claim 1, wherein
said switching device includes:
a signal generation unit for generating a pilot signal transmitted to said control device via a communication line included in said power cable and different from said power line, said signal generation unit causes said pilot signal to oscillate in response to a fact that a potential of said pilot signal attains a first potential, and said relay is closed in response to a fact that the potential of said pilot signal attains a second potential lower than said first potential.

12. A charging system, comprising:
a power cable;
an external power supply device; and
a vehicle in which a power storage device mounted thereon is configured to be charged with electric power transmitted from said external power supply device via said power cable,
said vehicle including:
an inlet to which said power cable is connected;
a PLC communication unit configured to establish power line communication with said external power supply device via a power line in said power cable; and
a control device for controlling a charging operation of said power storage device,
said power cable or said external power supply device including a switching device for switching between supply and interruption of the electric power from said external power supply device to said vehicle,
said switching device includes a relay for switching between electrical connection and disconnection between a power source in said external power supply device and said vehicle, wherein
said control device starts transmission of a request signal from said PLC communication unit to said external power supply device in response to connection of said power cable to said inlet, and when a transmission signal from said external power supply device to said PLC communication unit is not received, said control device closes said relay, and thereafter, retransmits said request signal from said PLC communication unit to said external power supply device.

13. A control method for controlling a vehicle by a control device, in said vehicle a power storage device mounted thereon being configured to be charged with electric power transmitted from an external power supply device via a power cable,
said vehicle including:
an inlet to which said power cable is connected; and
a PLC communication unit configured to establish power line communication with said external power supply device via a power line in said power cable,
said power cable or said external power supply device including a switching device for switching between supply and interruption of the electric power from said external power supply device to said vehicle,
said switching device includes a relay for switching between electrical connection and disconnection between a power source in said external power supply device and said vehicle,
said control method comprising the steps of:
determining whether or not said power cable is connected to said inlet;
starting transmission of a request signal from said PLC communication unit to said external power supply device in response to connection of said power cable to said inlet; and
when a transmission signal from said external power supply device to said PLC communication unit is not received, closing said relay, and thereafter, retransmitting said request signal from said PLC communication unit to said external power supply device.

* * * * *